(12) United States Patent
Rodriguez

(10) Patent No.: US 8,056,411 B2
(45) Date of Patent: Nov. 15, 2011

(54) SHAFT BALANCING SYSTEM AND METHODS

(75) Inventor: Rolando V. Rodriguez, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 388 days.

(21) Appl. No.: 12/395,821

(22) Filed: Mar. 2, 2009

(65) Prior Publication Data

US 2010/0218603 A1    Sep. 2, 2010

(51) Int. Cl.
*G01F 19/00* (2006.01)

(52) U.S. Cl. .............................................. 73/462; 73/66

(58) Field of Classification Search ....... 73/66, 460–462
See application file for complete search history.

(56) References Cited

U.S. PATENT DOCUMENTS

| 1,898,459 | A * | 2/1933 | Newcomb | 74/604 |
| 4,741,211 | A * | 5/1988 | Borner et al. | 73/462 |
| 5,469,741 | A * | 11/1995 | Scourtes et al. | 73/462 |
| 6,536,279 | B1 * | 3/2003 | Berna | 73/462 |
| 6,694,812 | B2 * | 2/2004 | Loetzner et al. | 73/462 |
| 6,813,973 | B1 * | 11/2004 | Perry | 74/607 |
| 6,923,058 | B2 * | 8/2005 | Nieman et al. | 73/462 |

* cited by examiner

*Primary Examiner* — Max Noori
(74) *Attorney, Agent, or Firm* — Ingrassia Fisher & Lorenz P.C.

(57) ABSTRACT

A shaft assembly has a shaft body, a first universal joint coupled to a first end of the shaft body, and a second universal joint coupled to a second end of the shaft body. A method for dynamically balancing the shaft assembly includes rotating the shaft assembly at a predetermined speed, determining a level of imbalance of the shaft assembly while rotating the shaft assembly at the predetermined speed, iteratively adjusting the position of the shaft body with respect to the first and second universal joints in response to the level of imbalance to determine an optimal level of imbalance while rotating the shaft assembly, and securely positioning the first and second universal joints with respect to the shaft body.

20 Claims, 6 Drawing Sheets

SHAFT BALANCING SYSTEM AND METHODS

TECHNICAL FIELD

The present invention generally relates to the testing and design of shaft assemblies, and more particularly relates to methods and systems for dynamically balancing such assemblies.

BACKGROUND

Shaft assemblies, such as "propshafts" and the like, are often used in automotive and aeronautical applications, and typically include a shaft body having universal joints coupled at both ends. Given the high speeds of such shafts during operation, it is desirable that any dynamic imbalances inherent in the shaft assembly be minimized, thereby reducing vibration and improving the lifetime of any powerplant components to which the shaft assembly is coupled.

Currently known methods for balancing shaft assemblies are unsatisfactory in a number of respects. For example, conventional methods generally focus on adding weights to the exterior of the shaft body in order to counteract any sensed imbalances. Such weights increase the overall weight of the assembly, and may detach during handling or operation. Furthermore, welding weights to the shaft can reduce tubing strength of the shaft body, and can also result in imprecise weight placement due to operator error, available space, inexact correction weights, or a change in the dynamic state caused by heat absorbed by the shaft. Because of such imprecision, a "verification spin" of the finished assembly is almost always necessary, greatly increasing manufacturing time and expense.

Another common method for shaft balancing, one that does not require adding individual weights, involves designing the shaft body with extra material—generally in the form circular features—and then removing material from these features to counteract any dynamic imbalance. Such methods also result in producing an unnecessarily heavy shaft, and consequently have a deleterious effect on performance and fuel economy.

Accordingly, it is desirable to provide improved systems and methods for dynamically balancing shaft assemblies. Other desirable features and characteristics of the present invention will become apparent from the subsequent detailed description and the appended claims, taken in conjunction with the accompanying drawings and the foregoing technical field and background.

BRIEF SUMMARY

In accordance with one embodiment of the present invention a shaft assembly to be balanced has a shaft body, a first universal joint coupled to a first end of the shaft body, and a second universal joint coupled to a second end of the shaft body. A method for dynamically balancing the shaft assembly includes rotating the shaft assembly at a predetermined speed, determining a level of imbalance of the shaft assembly while rotating the shaft assembly, iteratively adjusting the position of the shaft body with respect to the first and second universal joints in response to the level of imbalance to determine a minimum level of imbalance while rotating the shaft assembly, and securely positioning the first and second universal joints with respect to the shaft body.

An apparatus for balancing a shaft assembly in accordance with one embodiment includes: a first balancing head including a first set of actuatable pins configured to adjustably grasp the universal joint bearing cups at the first end of the shaft assembly and adjustably position the shaft body with respect to the first universal joint; a second balancing head including a second set of actuatable pins configured to adjustably grasp the universal joint bearing cups at the second end of the shaft assembly and adjustably position the shaft body with respect to the second universal joint; a shaft-spinning subsystem configured to cause rotation of the shaft assembly; a sensor subsystem configured to determine a level of imbalance of the shaft assembly during the rotation of the shaft-spinning subsystem; a controller coupled to the sensor subsystem and the first and second sets of actuatable pins, the controller configured to iteratively adjust the first and second sets of actuatable pins in response to the level of imbalance to determine an optimal (minimal) level of imbalance during the rotation of the shaft-spinning subsystem; and a plurality of retention components configured to securely position the first and second universal joints with respect to the shaft body.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following discussion generally relates to methods and apparatus for dynamically balancing shaft assemblies by iteratively adjusting its components during spin testing. In that regard, the following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to shaft design, automated testing, dynamic balancing systems, and the like need not be described in detail herein.

Figure 1:
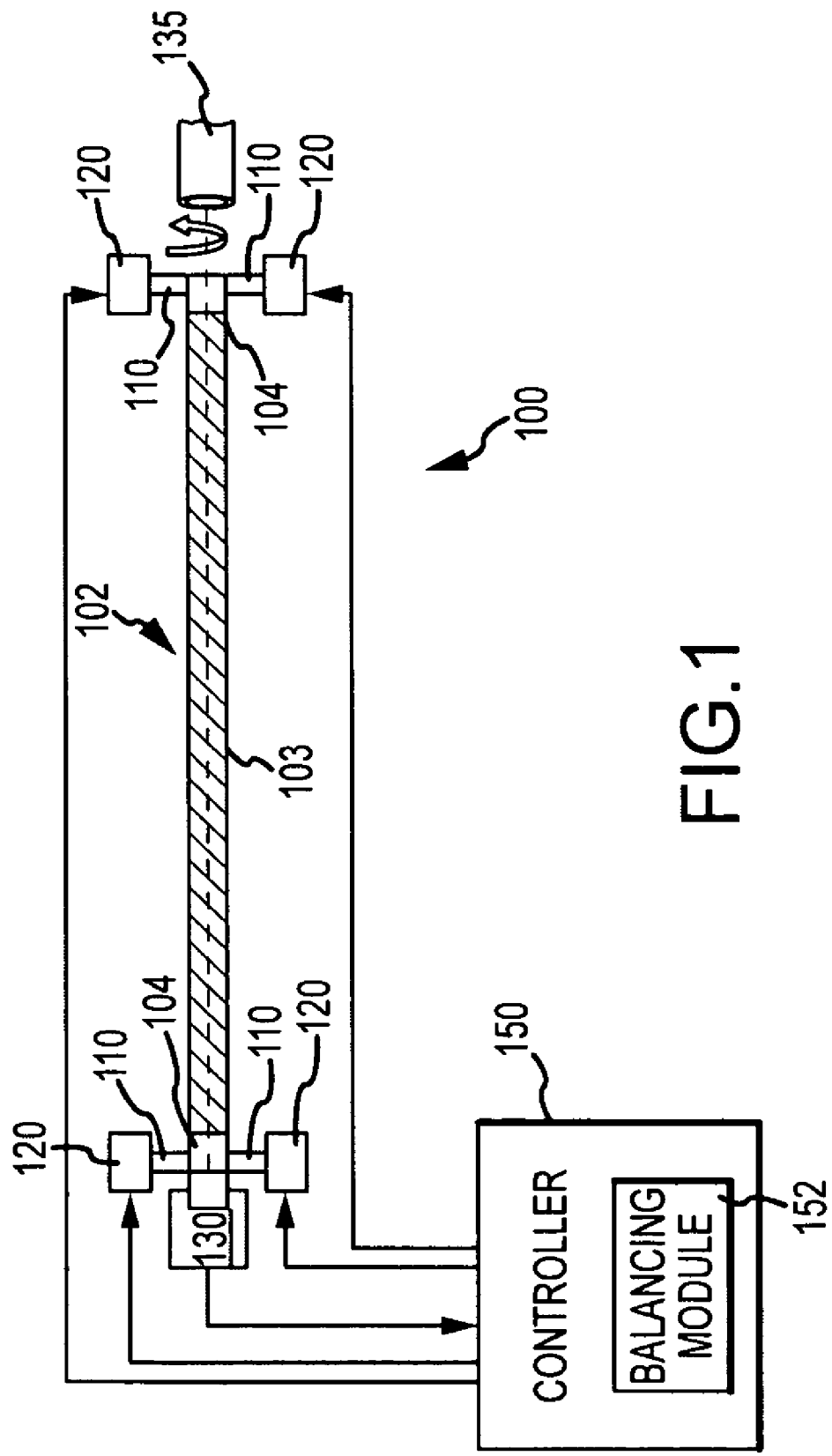
FIG. 1 is a conceptual system level view of a shaft balancing system in accordance with one embodiment.
Figure 2:
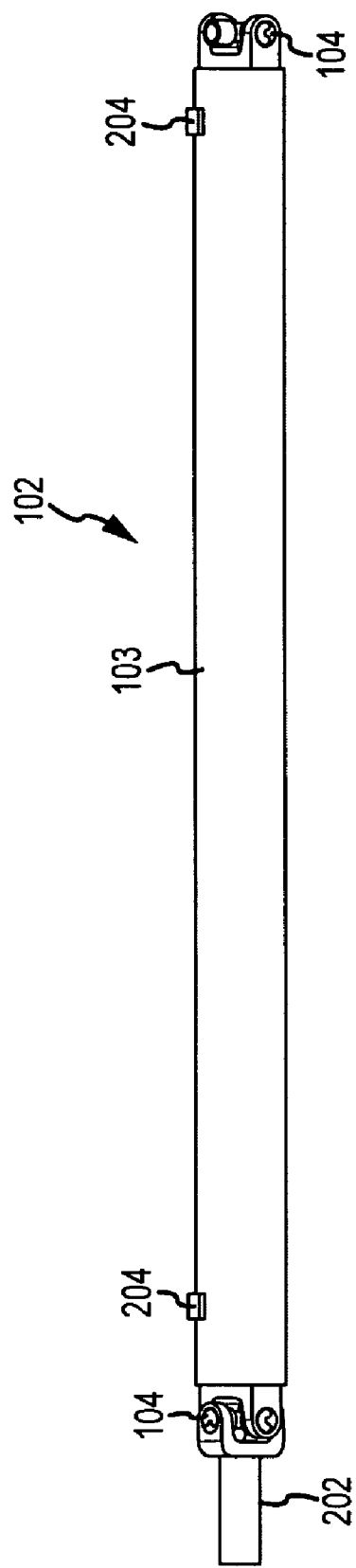
FIG. 2 depicts an exemplary shaft assembly.

Referring to the conceptual block diagram shown in FIG. 1, a balancing apparatus 100 in accordance with the present invention is configured to accept, secure, and balance a shaft assembly 102. Shaft assembly 102, as is known in the art, includes a shaft body 103 having a pair of universal joints 104 coupled to opposite ends. In this regard, FIG. 2 is an overview of a typical shaft assembly 102 balanced in the traditional manner, i.e., by the addition of compensating weights 204. In this illustration, a slip yoke 202 is coupled to the leftmost universal joint 104, and the rightmost universal joint is intended to couple to the driven axle. Shaft body 103 may be a single-piece or multi-piece type (which typically requires additional articulating joints) This invention is applicable to any and all universal joints in any type of propshaft, and may be used in connection with propshafts without slip yokes, propshafts with an inboard slip mechanism, and propshafts with flanges.

Referring again to FIG. 1, balancing apparatus 100 includes actuatable pins 110 slideably controlled by respective actuators 120. One set of actuatable pins 110 is configured to adjustably grasp the leftmost universal joint 104 at the end of shaft assembly 102 and adjustably position shaft body 102 with respect to the respective universal joint 104. A second set of actuatable pins 110 configured to adjustably grasp the rightmost universal joint 104 at the end of shaft assembly 102 and adjustably position shaft body 103 with respect to the rightmost universal joint 104.

A shaft-spinning subsystem 135 is configured to cause rotation of shaft assembly 102 relative to the assembly structure or housing. Shaft-spinning subsystem 135 may include any suitable conventional motor and control system capable of rotating at a predetermined speed, as is known in the art.

A sensor subsystem 130 is configured to determine a level of imbalance of shaft assembly 102 during rotation and communicate imbalance information to a balancing module 152 within a controller 150 (e.g., a general purpose computer, a microcontroller, or any other suitable combination of hardware, software, and/or firmware). Such sensor subsystems 130 generally sense forces along a plurality of axes as assembly 102 is rotated, and are well known in the art.

Controller 150 is coupled to sensor subsystem 130 and the first and second sets of actuatable pins 110 via any convenient wired or wireless communication channel (e.g., standard Ethernet, WiFi, Bluetooth, ZigBee, etc.). Controller 150, via balancing module 152, is configured to iteratively adjust the first and second sets of actuatable pins 110 in response to the level of imbalance (received from subsystem 130) to determine a minimum level of imbalance during actual rotation. After the optimal (most balanced) configuration is determined, a number of retention components are configured to securely position the first and second universal joints 104 with respect to shaft body 103, as described in further detail below.

Figure 3:
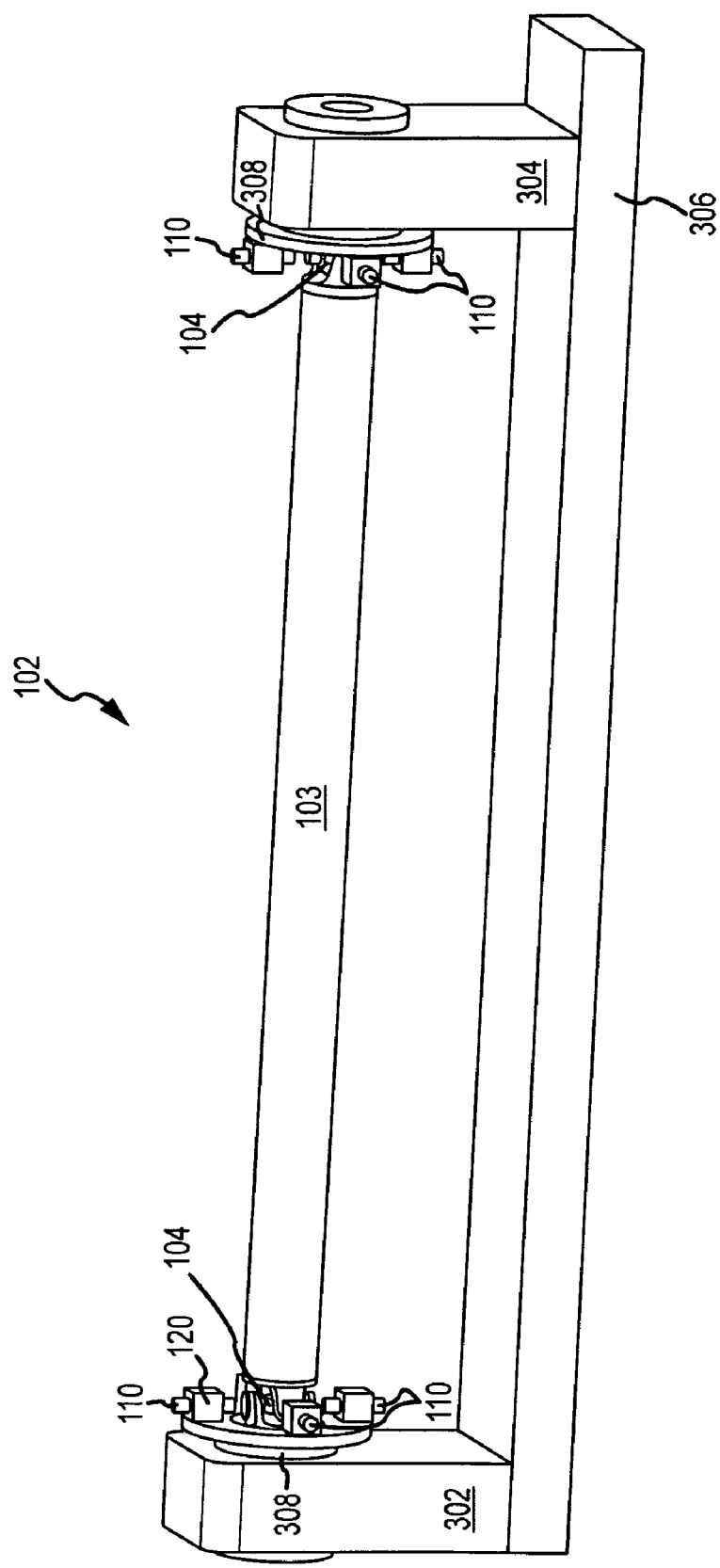
FIG. 3 illustrates a balancing apparatus in accordance with one embodiment.

FIG. 3 shows an overview of a balancing apparatus 100 in accordance with one embodiment. As shown, one end of shaft assembly 102 is connected (via actuatable pins 110) to a fixed balancing head 302, and the opposite end of shaft assembly 102 is likewise connected to adjustable (slideable) balancing head 304. That is, balancing head 304 may slide with respect to base or housing 306 in order to accommodate a variety of shaft lengths.

Figure 4A:
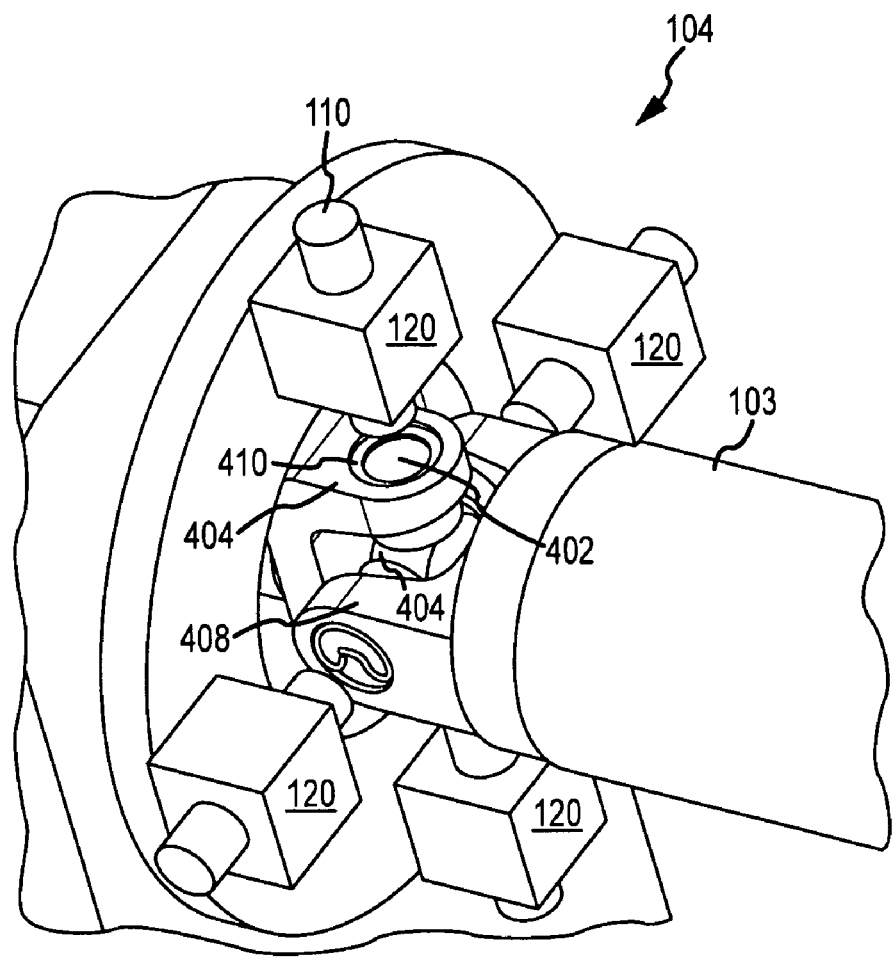
FIGS. 4A and 4B are close-ups of the balancing apparatus of FIG. 3.
Figure 4B:
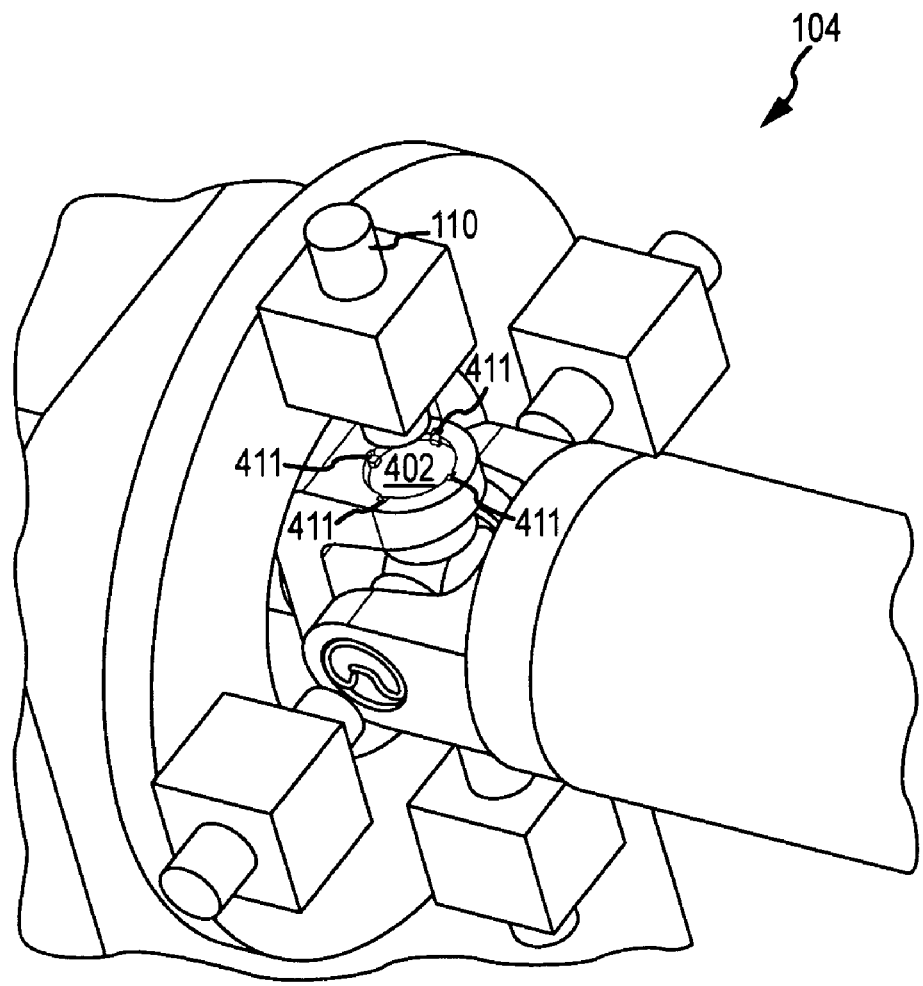

Referring now to the close-ups shown in FIGS. 4A and 4B, a universal joint 104 generally includes an internal cross-shaped component 408 rotatably coupled to a pair of yokes 404 via bearing structures having respective bearing cups 402. In one embodiment, the actuatable pins 110 are configured to apply a compressive force on bearing cups 402 during the balancing process, allowing component 408 to be adjusted along two perpendicular axes with respect to yokes 404.

In one embodiment, retention components 410 are in situ formed polymeric retainers (FIG. 4A). That is, the retaining components are formed (for example, by injecting and curing a liquid thermoplastic compound between the relevant components) while assembly 102 is still secured within the testing apparatus. In one embodiment, for example, retainers 410 are formed from a nylon-based material injected into the resulting gap, then suitably cured. A number of other standard methods can be used to secure the universal joints 104 using various metal forming operations—i.e., "staking operations". This latter embodiment is shown in FIG. 4B, where deformed sections 411 are used to secure the components.

Figure 5:
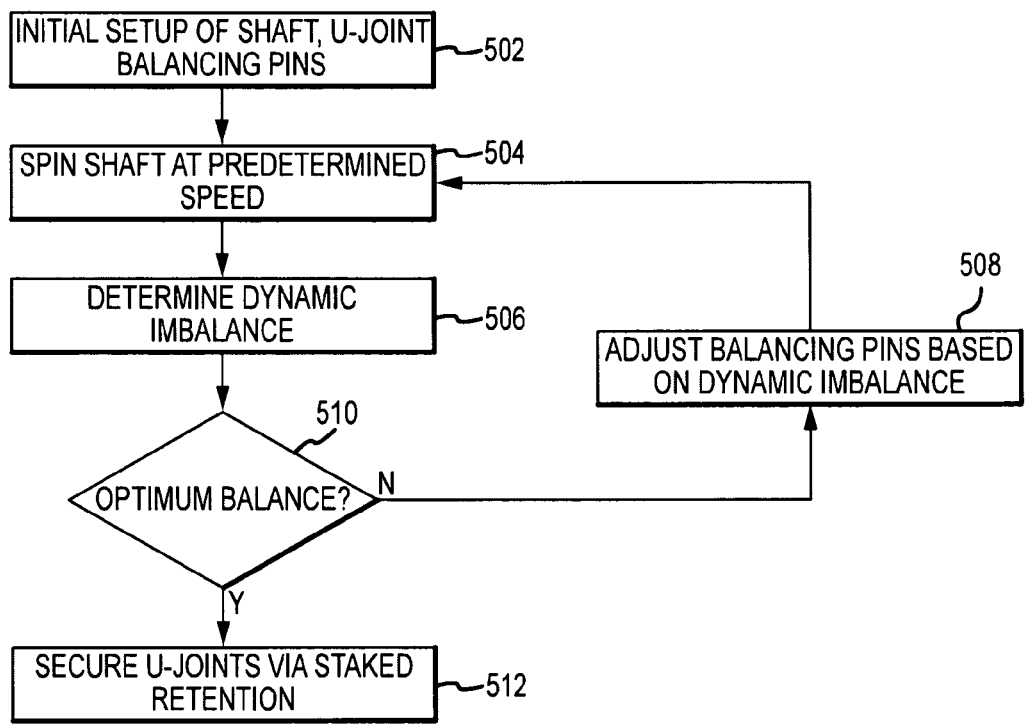
FIG. 5 is a flowchart depicting a balancing method in accordance with one embodiment.

FIG. 5 is a flowchart generally illustrating a method for balancing a shaft assembly in accordance with one embodiment. As shown, the shaft assembly undergoes initial setup within the test assembly (502). This might typically include initial positioning of the shaft, universal joints, actuatable pins, etc.

Next, the test assembly is activated to cause rotation of the shaft assembly at a predetermined speed (504). The test speed may be selected depending upon the nature of the application. In one embodiment, for example, the shaft assembly is rotated at approximately 3500 rpm.

Next, the system (via controller 150, balancing module 152, and sensing subsystem 130) determines a level of imbalance of shaft assembly 102 during rotation (506). As mentioned above, the nature of such sensors and the acquisition of force data are well known in the art, and need not be described herein.

Balancing module 152 then iteratively adjusts the position of the shaft body with respect to the first and second universal joints (e.g., via signals sent to actuatable pins 110) in response to the level of imbalance to determine an optimal level of imbalance while rotating the shaft assembly (508, 510). The optimization may be performed in accordance with a variety of known algorithms, including steepest descent, and the like. Since the positioning pins 110 have mass, and therefore contribute to the total rotating imbalance, the balancing optimization algorithm takes their positioning into account to determine the resultant dynamic balance state of the rotating shaft.

After optimization is complete, the rotation is ceased, and before removing assembly 102 from test apparatus 100 the first and second universal joints are secured in place relative to shaft body 103 using a retention scheme as described above (512).

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. An apparatus for balancing a shaft assembly having a shaft body, a first universal joint coupled to a first end of the shaft body, and a second universal joint coupled to a second end of the shaft body, the apparatus comprising:
    a first balancing head including a first set of actuatable pins configured to adjustably grasp the first universal joint at the first end of the shaft assembly and adjustably position the shaft body with respect to the first universal joint;
    a second balancing head including a second set of actuatable pins configured to adjustably grasp the second universal joint at the second end of the shaft assembly and adjustably position the shaft body with respect to the second universal joint;
    a shaft-spinning subsystem configured to cause rotation of the shaft assembly;
    a sensor subsystem configured to determine a level of imbalance of the shaft assembly during the rotation of the shaft-spinning subsystem;
    a controller coupled to the sensor subsystem and the first and second sets of actuatable pins, the controller configured to iteratively adjust the first and second sets of actuatable pins in response to the level of imbalance to determine an optimal level of imbalance during the rotation of the shaft-spinning subsystem; and a plurality of retention components configured to securely position the first and second universal joints with respect to the shaft body.

2. The apparatus of claim 1, wherein the first universal joint comprises a cross-shaped component rotatably coupled to a first yoke and a second yoke via bearing structures having respective bearing cups, further wherein the first set of actuatable pins apply compressive force on the bearing cups.

3. The apparatus of claim 1, wherein the plurality of retention components comprise in situ formed polymeric staked retainers or metal retaining stakes.

4. The apparatus of claim 3, wherein the in situ formed staked retainers comprise nylon.

5. The apparatus of claim 1, wherein the sensor subsystem senses imbalance forces during the rotation of the shaft assembly.

6. The apparatus of claim 1, wherein the controller is coupled to the first and second set of actuatable pins via a wireless data connection.

7. A method of balancing a shaft assembly having a shaft body, a first universal joint coupled to a first end of the shaft body, and a second universal joint coupled to a second end of the shaft body, a first balancing head adjustably coupled to the first universal joint, and a second balancing head adjustably coupled to the second universal joint, the method comprising:
rotating the shaft assembly at a predetermined speed;
determining a level of imbalance of the shaft assembly while rotating the shaft assembly at the predetermined speed;
iteratively adjusting the first balancing head and the second balancing head to position the shaft body with respect to the first and second universal joints in response to the level of imbalance to determine an optimal level of imbalance while rotating the shaft assembly;
ceasing rotation of the shaft assembly; and
securely positioning the first and second universal joints with respect to the shaft body.

8. A method of balancing a shaft assembly having a shaft body, a first universal joint coupled to a first end of the shaft body, and a second universal joint coupled to a second end of the shaft body, the method comprising:
rotating the shaft assembly at a predetermined speed;
determining a level of imbalance of the shaft assembly while rotating the shaft assembly at the predetermined speed;
iteratively adjusting the position of the shaft body with respect to the first and second universal joints in response to the level of imbalance to determine an optimal level of imbalance while rotating the shaft assembly;
ceasing rotation of the shaft assembly; and
securely positioning the first and second universal joints with respect to the shaft body;
coupling the first end of the shaft assembly to a first balancing head via a first set of actuatable pins configured to adjustably position the shaft body with respect to the first universal joint;
coupling the second end of the shaft assembly to a second balancing head including a second set of actuatable pins configured to adjustably position the shaft body with respect to the second universal joint.

9. A method of balancing a shaft assembly having a shaft body, a first universal joint coupled to a first end of the shaft body, and a second universal joint coupled to a second end of the shaft body, the method comprising:
rotating the shaft assembly at a predetermined speed;
determining a level of imbalance of the shaft assembly while rotating the shaft assembly at the predetermined speed;
iteratively adjusting the position of the shaft body with respect to the first and second universal joints in response to the level of imbalance to determine an optimal level of imbalance while rotating the shaft assembly;
ceasing rotation of the shaft assembly; and
securely positioning the first and second universal joints with respect to the shaft body;
wherein securely positioning the first and second universal joints includes forming a staked retainer in situ within the first and second universal joints.

10. The method of claim 9, wherein securely positioning the first and second universal joints includes injecting and curing a thermoplastic material in the first and second universal joints or forming metal retaining stakes.

11. The method of claim 10, wherein the thermoplastic material is a nylon-based material.

12. The method of claim 7, wherein the first universal joint comprises a cross-shaped component rotatably coupled to a first yoke and a second yoke via bearing structures having respective bearing cups, and wherein step of iteratively adjusting includes applying a compressive force on the bearing cups.

13. The method of claim 7, wherein determining the level of imbalance includes sensing imbalance forces during the rotation of the shaft assembly.

14. The method of claim 8, wherein the step of iteratively adjusting includes communicating, through a data communication channel, target actuator positions to the sets of actuatable pins.

15. The method of claim 14, wherein the step of iteratively adjusting includes determining the target actuator positions by executing machine readable instructions in a microprocessor implementing an optimization algorithm to determine the optimal level of imbalance.

16. The method of claim 8, wherein the step of iteratively adjusting includes compensating for the size, weight, and position of the first and second sets of actuatable pins.

17. A shaft assembly comprising:
a shaft body having a first end and a second end;
a first universal joint coupled to the first end of the shaft body, the first universal joint comprising a first yoke fixed to the shaft body, a second yoke, and a first cross component rotatably coupled to the first and second yokes via a first set of bearing components;
a second universal joint coupled to the first end of the shaft body, the second universal joint comprising a third yoke fixed to the shaft body, a fourth yoke, and a second cross component rotatably coupled to the third and fourth yokes via a second set of bearing components; and
a first set of staked retainers coupled between the first set of bearing components and the second yoke, and a second set of staked retainers coupled between the second set of bearing components and the forth yoke;
wherein each of the first and second set of staked retainers has a shape and a position such that the dynamic balance of the shaft assembly during rotation is substantially optimal.

18. The shaft of claim 17, wherein each of the first and second set of staked retainers comprises an in situ formed thermoplastic retainer or formed metal stakes.

19. The shaft of claim 18, wherein the thermoplastic retainer comprises a nylon-based material.

20. The shaft of claim 17, wherein the shaft body is a multi-piece shaft.

* * * * *